(12) United States Patent
Dziorny et al.

(10) Patent No.: US 8,042,354 B1
(45) Date of Patent: Oct. 25, 2011

(54) AIR CONDITIONING APPARATUS

(75) Inventors: Paul J. Dziorny, Mount Airy, MD (US); Benjamin D. Sellers, Mount Airy, MD (US)

(73) Assignee: Fairchild Controls Corporation, Frederick, MD (US)

( * ) Notice: Subject to any disclaimer, the term of this patent is extended or adjusted under 35 U.S.C. 154(b) by 645 days.

(21) Appl. No.: 11/906,015

(22) Filed: Sep. 28, 2007

(51) Int. Cl.
  *F25D 9/00* (2006.01)
  *F25D 19/02* (2006.01)
(52) U.S. Cl. .......................................... 62/402; 62/172
(58) Field of Classification Search ............... 62/86, 401, 62/402, 434, 87; 60/36, 599, 670; 165/140
See application file for complete search history.

(56) References Cited

U.S. PATENT DOCUMENTS

| | | | | |
|---|---|---|---|---|
| 2,496,602 | A * | 2/1950 | Schlichtig | 62/88 |
| 2,892,322 | A * | 6/1959 | Schelp | 62/314 |
| 3,277,658 | A * | 10/1966 | Leonard, Jr. | 62/87 |
| 3,728,857 | A * | 4/1973 | Nichols | 62/469 |
| 3,728,859 | A * | 4/1973 | Seiler | 60/39.49 |
| 3,868,827 | A * | 3/1975 | Linhardt et al. | 62/63 |
| 4,261,416 | A * | 4/1981 | Hamamoto | 165/271 |
| 4,503,683 | A * | 3/1985 | Wieland et al. | 62/86 |
| 4,535,606 | A * | 8/1985 | Rannenberg | 62/402 |
| 4,550,573 | A * | 11/1985 | Rannenberg | 62/172 |
| 5,137,230 | A * | 8/1992 | Coffinberry | 244/118.5 |
| 5,259,196 | A * | 11/1993 | Faulkner et al. | 60/599 |
| 5,353,597 | A * | 10/1994 | Faulkner et al. | 60/599 |
| 6,164,084 | A * | 12/2000 | Watson et al. | 62/402 |
| 2001/0025507 | A1* | 10/2001 | Buchholz et al. | 62/402 |
| 2004/0020206 | A1* | 2/2004 | Sullivan et al. | 60/670 |

* cited by examiner

*Primary Examiner* — Frantz Jules
*Assistant Examiner* — Emmanuel Duke
(74) *Attorney, Agent, or Firm* — Michael W. York

(57) ABSTRACT

An air conditioning apparatus that includes a turbine and a compressor with rotors mounted on and fixed to a common rotatable shaft with a heat exchanger located between the turbine and the compressor. The air conditioning apparatus turbine has an inlet that is connected to a source of air such as aircraft ram air the outlet from the turbine and is positioned to direct outlet air from the turbine to the heat exchanger. The compressor which is located adjacent to and downstream from the heat exchanger has an inlet that is positioned to receive air exiting from the heat exchanger. In one embodiment, no external power is necessary to obtain cooling of liquid coolant located within the heat exchanger that is integral with the air conditioning apparatus and another embodiment includes test equipment.

10 Claims, 5 Drawing Sheets

AIR CONDITIONING APPARATUS

BACKGROUND OF THE INVENTION

Air conditioning apparatus currently in use on many aircraft incorporate machines that include a turbine and compressor mounted on the same shaft, with air supplied to the compressor from the engine. The air supplied from the engine (engine bleed air) is typically cooled by passing it through a heat exchanger which uses ram air to remove the heat from the bleed air. That cooled air then enters the compressor, where it is pressurized to a higher level. That high pressure air is then typically cooled as it passes through a second heat exchanger which also utilizes ram air to remove the heat of compression. The cooled high pressure air then enters the turbine, where it expands while performing work that powers the compressor rotor. As it expands and performs work, the temperature of the air is reduced and that cooled air is supplied to the cabin. Numerous variations on this basic configuration have been proposed, as evidenced by U.S. Pat. Nos. 4,261,416; 5,025,642, and 6,796,131. The basic principle for these systems is also well known and such systems are described in general as air cycle systems.

The basic principle associated with all air cycle systems is that when a turbine performs work, it expends energy and as the energy is expended, the temperature of the air cools as it expands through the turbine. The difference in temperature between the inlet and the outlet increases as the difference in pressure between the inlet and outlet of the turbine increases. Consequently, more cooling occurs when the pressure difference across the turbine increases. If the outlet of the turbine can be depressed below ambient pressure, the pressure difference across the turbine will increase, and correspondingly a lower exhaust temperature will result. Based on those principles, a depressed ambient system whereby the inlet of the compressor draws air below ambient, creating a vacuum, will result in greater cooling of the air as it passes through the turbine. Unfortunately, past air conditioning systems have not utilized this potential as does the present air conditioning apparatus invention which uses a unique turbine, heat exchanger and compressor configuration. This unique turbine, heat exchanger and compressor configuration offers numerous advantages over previous air conditioning systems including increased cooling, increased efficiency, increased reliability as well as simplified construction and the important ability to operate in an aircraft without the need for supplied power.

SUMMARY OF THE INVENTION

This invention relates to air conditioning apparatus and more particularly to air conditioning apparatus that is particularly suitable for use on aircraft.

It is accordingly an object of the present invention to provide an air conditioning apparatus having a greater cooling effect.

It is an object of the present invention to provide an air conditioning apparatus having increased cooling efficiency.

It is an object of the present invention to provide an air conditioning apparatus that requires no connected power source.

It is an object of the present invention to provide an air conditioning apparatus that can be located where no power source is available.

It is an object of the present invention to provide an air conditioning apparatus that can be located on portions of an aircraft where power is not available.

It is an object of the present invention to provide an air conditioning apparatus that can be located in a remote location on an aircraft such as in an external pod or the like.

It is an object of the present invention to provide an air conditioning apparatus that has the capability of operating effectively under a variety of aircraft operating conditions.

It is an object of the present invention to provide an air conditioning apparatus that has the capability of operating effectively under a variety of aircraft operating conditions including different aircraft speeds and altitudes.

It is an object of the present invention to provide an air conditioning apparatus that has an efficient compact configuration.

It is an object of the present invention to provide an air conditioning apparatus that has a compact, simple and light weight configuration.

It is an object of the present invention to provide an air conditioning apparatus that has a compact, simple and light weight configuration that provides increased performance at a low cost.

It is an object of the present invention to provide an air conditioning apparatus that has an efficient compact configuration that uses a turbine and a compressor mounted on the same shaft.

It is an object of the present invention to provide an air conditioning apparatus that uses a turbine and a compressor mounted on the same shaft where the turbine and a compressor are mounted differently than in prior art designs.

It is an object of the present invention to provide an air conditioning apparatus that does not require air seals that reduce the reliability of the air conditioning apparatus.

It is an object of the present invention to provide an air conditioning apparatus that does not require air seals that are difficult and expensive to manufacture.

It is an object of the present invention to provide an air conditioning apparatus that does not use internal bearings that interfere with efficient operation of the air conditioning apparatus.

It is an object of the present invention to provide an air conditioning apparatus that does not require external ducting for its operation.

These and other objects of the invention will be apparent from the following described air conditioning apparatus invention that includes a turbine and a compressor mounted on and fixed to a common rotatable shaft with a heat exchanger located between the turbine and the compressor. The air conditioning apparatus turbine has an inlet that is connected to a source of air such as aircraft ram air the outlet from the turbine is positioned to direct outlet air from the turbine to the heat exchanger. The compressor which is located adjacent to and downstream from the heat exchanger has an inlet that is positioned to receive air exiting from the heat exchanger. The air conditioning apparatus can also include test equipment for checking the operation of the air conditioning apparatus and a coolant pump.

BRIEF DESCRIPTION OF THE DRAWINGS

The invention will be hereinafter more completely described with reference to the accompanying drawings in which.

DETAILED DESCRIPTION OF THE PREFERRED EMBODIMENTS

Figure 1:
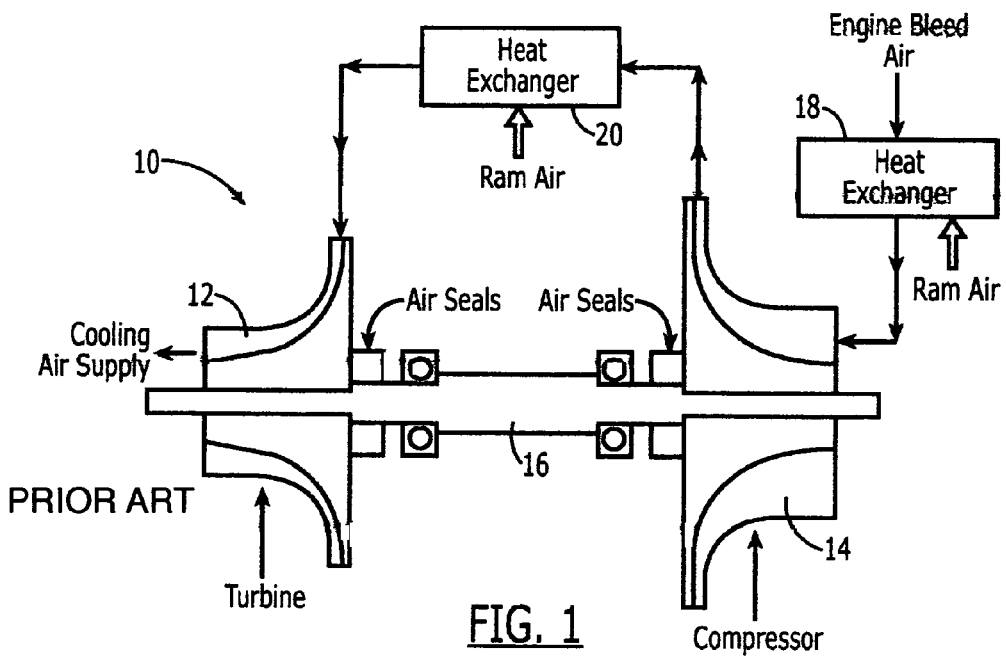
FIG. 1 is a schematic view of a prior art air conditioning apparatus.

In order to understand the invention and how it is different from the prior art, it is helpful to consider a typical prior art system such as the prior art system illustrated in FIG. 1. The air conditioning apparatus currently in use on many aircraft is illustrated in FIG. 1 and is designated generally by the number 10. This air conditioning apparatus 10 includes a turbine 12 and compressor 14 mounted on the same shaft 16, with air supplied to the compressor from the engine of the aircraft (not shown). The air supplied from the engine (engine bleed air) is typically cooled by passing it through a heat exchanger 18 which uses aircraft engine ram air to remove the heat from the bleed air. That cooled air then enters the compressor 14, where it is pressurized to a higher level. That high pressure air is then typically cooled as it passes through a second heat exchanger 20 which also utilizes ram air to remove the heat of compression. The cooled high pressure air then enters the turbine 12, where it expands while performing work that powers the compressor rotor. As it expands and performs work, the temperature of the air is reduced and that cooled air is supplied to the cabin of the aircraft.

As indicated previously, the basic principle associated with all air cycle systems is that when a turbine performs work, it expends energy. As the energy is expended, the temperature of the air cools as it expands through the turbine. The difference in temperature between the inlet and the outlet increases as the difference in pressure between the inlet and outlet of the turbine increases. Consequently, more cooling occurs when the pressure difference across the turbine increases. If the outlet of the turbine can be depressed below ambient pressure, the pressure difference across the turbine will increase, and correspondingly a lower exhaust temperature will result. Based on those principles, a depressed ambient system whereby the inlet of the compressor draws air below ambient pressure, creating a vacuum, will result in greater cooling of the air as it passes through the turbine. This invention is constructed in a unique manner to take advantage of these principles.

Figure 2:
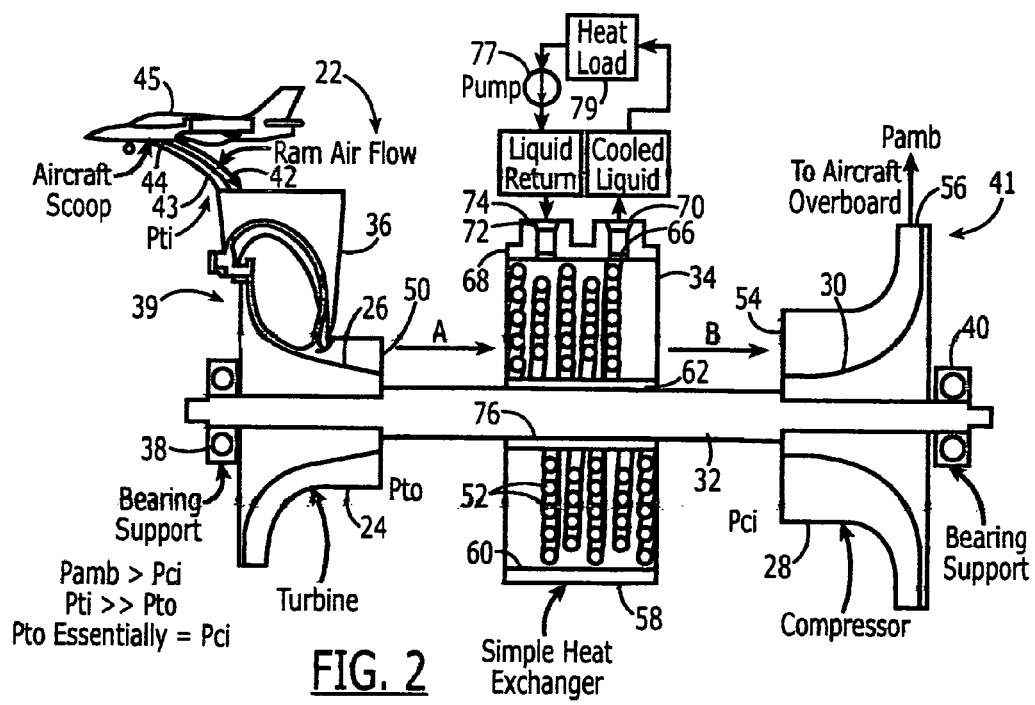
FIG. 2 is a schematic view of one embodiment of the air conditioning apparatus invention with major portions of the air conditioning apparatus housing removed for clarity.

The air conditioning apparatus invention is illustrated in FIG. 2 and is designated generally by the number 22. The air conditioning apparatus 22 comprises a turbine 24 with a turbine rotor 26 and an adjacently located compressor 28 with a compressor rotor 30 mounted on the same shaft 32 as the turbine rotor 26. The air conditioning apparatus 22 also comprises a simple heat exchanger 34 mounted around the shaft 32 between the turbine 24 and the compressor 28 and a housing 36 for the air conditioning apparatus 22 that surrounds the turbine 24, the compressor 28, the heat exchanger 34 as well as the shaft 32. The air conditioning apparatus 22 also comprises support bearings 38 and 40 for the shaft 32 that are mounted on the shaft 32 within the housing 36 outboard of the respective rotors 26 and 30. For clarity, only a portion of the housing 36 is illustrated in FIG. 2. The air conditioning apparatus 22 has an upstream end portion represented by the number 39 and a downstream end portion represented by the number 41 and the air conditioning apparatus 22 is configured to handle operating air such as ram air 42 from an aircraft 45 that enters the air conditioning apparatus 22 at the upstream portion 39 and leaves the air conditioning apparatus at the downstream portion 41.

Figure 3:
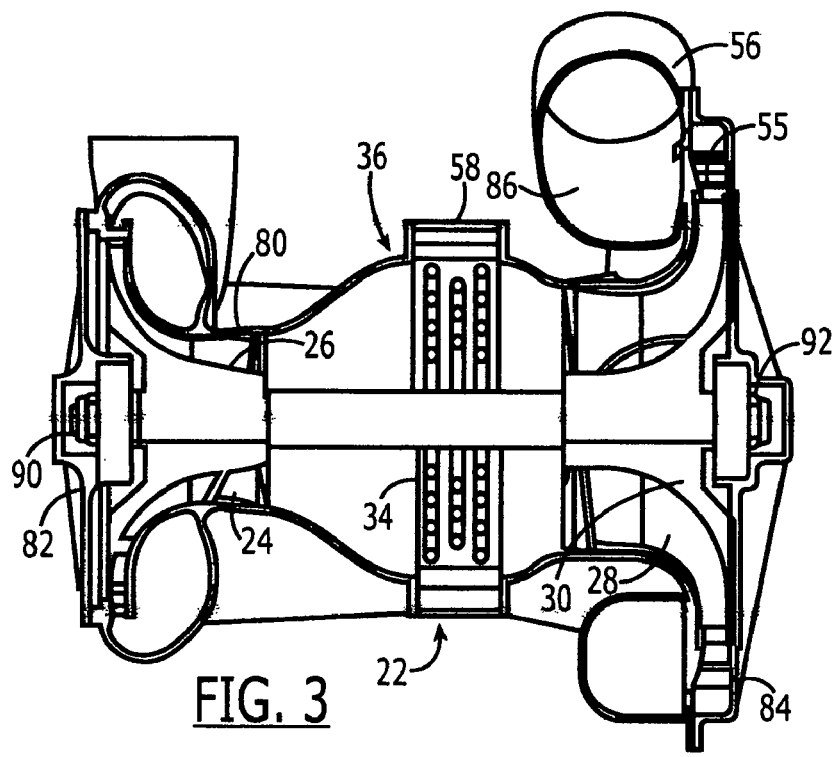
FIG. 3 is a cross sectional view of the embodiment of the air conditioning apparatus invention illustrated in FIG. 2 showing the housing.

Ram air flow, indicted by the arrow 42, from an aircraft air scoop 44 of an aircraft 45 is ducted by a conduit 43 to the turbine inlet 46 of the turbine 24 of the air conditioning apparatus 22. The pressure of the ram air 42 is higher than ambient air pressure while the aircraft 45 with the air conditioning apparatus 22 is in flight. When the aircraft and its air conditioning apparatus 22 is in flight, the ram air 42 enters the turbine 24 through the conduit 43 and expands as it passes through the turbine 24, performing work and thereby giving up heat and the air leaves the turbine 24 at a lower temperature than it entered the turbine 24. The heat exchanger 34 is mounted within the air conditioning apparatus 22, directly downstream of the turbine outlet 50. The cooler turbine exhaust air from the turbine outlet 50 passes through this heat exchanger 34, cooling the liquid flowing within the coils 52 of the heat exchanger 34. After passing through the heat exchanger 34, the air enters the compressor inlet 54. The power of the turbine 24, with its rotating rotor 26 is expended in compressing the air that enters the compressor 28, which is directly driven by the turbine rotor 26 since the compressor rotor 30 is mounted on and fixed to the same shaft 32 as the turbine rotor 26. The air leaves the compressor 28 after passing through a diffuser 55 (FIG. 3) and enters the compressor outlet 56 and is ducted out of the air conditioning apparatus 22 and overboard from the aircraft 45. An important difference between the prior art air conditioning apparatus 10 in FIG. 1 and the air conditioning apparatus apparatus invention 22 in FIGS. 2 and 3 is that in the air conditioning apparatus invention 22, the turbine 24 is upstream of the compressor 28 whereas in the prior art the air conditioning apparatus 10, the compressor 14 is upstream of the turbine 12.

As indicated previously, this is important since if the pressure of the air at the outlet of the turbine 24 can be depressed below the ambient pressure, the pressure drop across the turbine 24 will increase, and a correspondingly lower turbine 24 exhaust temperature will result. What the compressor 28 does when the air conditioning apparatus invention 22 is in normal operation in flight in an aircraft 45 is to draw the air exiting from the turbine 24 below ambient pressure, creating a vacuum, which results in much greater cooling of the air as it passes through the turbine 24 than would normally occur without this vacuum since the air pressure drop from the turbine inlet 46 to the turbine outlet 50 is greatly increased. In order to indicate the various pressures associated with the air conditioning apparatus 22 while it is in operation in flight, in the aircraft 45 the following letter designations are used in FIG. 2:

Pti=Air pressure at the turbine inlet 46
Pto=Air pressure at the turbine outlet 50
Pci=Air pressure at the compressor inlet 54
Pamb=Ambient air pressure outside the aircraft 45

Due to the operation of the compressor 28, that creates a vacuum at its inlet 54, the following is created when air conditioning apparatus invention 22 is in normal use in operation in flight in an aircraft 45:

Pamb>Pci and since Pci essentially=Pto

Pti>>Pto.

The simple heat exchanger 34 is illustrated in detail in FIGS. 2 and 3 and comprises an outer ring shaped heat exchanger housing 58, circular spiral shaped hollow cooling coils 52 located within an aperture 60 in the heat exchanger housing 58 and secured in this location by being connected to the outside of a ring-shaped mounting hub 62 that is centrally located and secured inside the aperture 60 in the heat exchanger housing 58. The outer ends 66 and 68 of the hollow cooling coils 52 are connected to respective apertures 70 and 72 that are located in the outer surface 74 of the heat exchanger housing 58. It will be noted that the hub 62 has a centrally located hole 76 that is sized and shaped to accept the shaft 32 and to allow the shaft 32 to freely rotate inside the hole 76. This configuration of the heat exchanger 34 allows it to be mounted around the shaft 32 immediately adjacent to and between the exhaust outlet 50 of the turbine 24 and the inlet 54 of the compressor 28. This arrangement not only offers simplicity but it also minimizes both the pressure loss associated with the liquid passing through the cooling coils 52 as well as the pressure loss of the air passing over the loops of the cooling coils 52.

As indicated in FIG. 2, in order to move liquid coolant through the heat exchanger 34, a pump 77 is provided that is in fluid communication with the heat exchanger 34 and that is also in fluid communication with the heat load 79 that will be located outside of the air conditioning apparatus 22 within the aircraft 45. This pump 77 can be installed at a location separate from the air conditioning apparatus 22 itself or it can be incorporated into the air conditioning apparatus 22 in a manner that will be hereinafter described in detail.

Since the pressure loss of the air passing over the coils of the cooling coils 52 is small, there is little difference in pressure between the turbine exhaust air A and the compressor inlet air B or as previously indicated in connection with FIG. 2, Pto essentially=Pci. Consequently, there is no need to incorporate a sealing device between the turbine 24 and compressor 28. Indeed, one of the primary advantages of the configuration in FIGS. 2 and 3 is that there is no need to incorporate a sealing device acting between the rotating rotors 26 and 30 and the static members of the air conditioning apparatus 22. This is a major advantage compared to typical air cycle machines utilized in air cycle systems. A typical air cycle machine will contain at least two labyrinth seals; one for each rotor. By arranging the compressor 28 and turbine 24 as illustrated in FIGS. 2 and 3, the need for an air seal between the rotating assembly and the static members of the air conditioning apparatus 22 is obviated. The air conditioning apparatus 22 is correspondingly simpler, less costly, and more reliable than typical air cycle machines used in standard air cycle systems. Different types of heat exchangers can be utilized, as long as they can conveniently be mounted within the housing 36 of the air conditioning apparatus 22. However, the heat exchanger 34 described and illustrated herein is preferred due to its compactness, excellent cooling and low pressure loss.

As previously indicated, the support bearings 38 and 40 are mounted outboard of each of the rotors 26 and 30, as illustrated in FIGS. 2 and 3. By locating the bearings 38 and 40 outboard of the rotors 26 and 30, the flow of air from the turbine outlet 50 through the heat exchanger 34 to the compressor inlet 54 is unobstructed. In addition, the location of the bearings 38 and 40 adjacent to each respective rotor 26 and 30 minimizes the reaction load carried by the bearings 38 and 40. The rotors 26 and 30 can be sized to maintain machine speeds within the range at which grease packed bearings can provide adequate life. Mounting the bearings 38 and 40 in this fashion also allows for sizing of the shaft 32 located between the two rotors 26 and 30 to avoid rotor dynamic excitation within the operating range.

In FIG. 3, a number of additional details of the air conditioning apparatus 22 that were omitted from FIG. 2 are included. As illustrated in FIG. 3, the housing 36 includes a turbine housing 80 that contains a collection plenum 82 into which the ram airflow 42 from the aircraft ram air scoop 44 is ducted. Ram air collected in the turbine housing 80 is accelerated through the collection plenum 82 and enters the turbine rotor 26. The compressor rotor 30 is also shown housed within a compressor housing 84. As indicated previously, the compressor housing 84 contains a diffuser section 55 directly upstream of the compressor outlet 56 which serves to increase the efficiency of the air conditioning apparatus 22 by diffusing the air as it leaves the compressor rotor 30. After exiting the diffuser section 55, the air enters a collection plenum 86 provided by the compressor housing 84 and then passes out the compressor outlet 56. From the outlet 56, the air either passes directly overboard or to aircraft ducting which ducts the air overboard. The overboard air vent would be positioned to minimize the effect of flight on the overboard air. This is readily accomplished by directing the overboard flow either to a low pressure surface of the aircraft, or simply ducting the air perpendicular to the direction of aircraft 45 travel. The turbine housing 80 and the compressor housing 84 are joined at the center of the air conditioning apparatus 22 to the previously described heat exchanger housing 58. As illustrated in FIG. 3, two respective simple end caps 90 and 92 for the bearings 38 and 40 are located outboard of the respective rotors 26 and 30.

Figure 4:
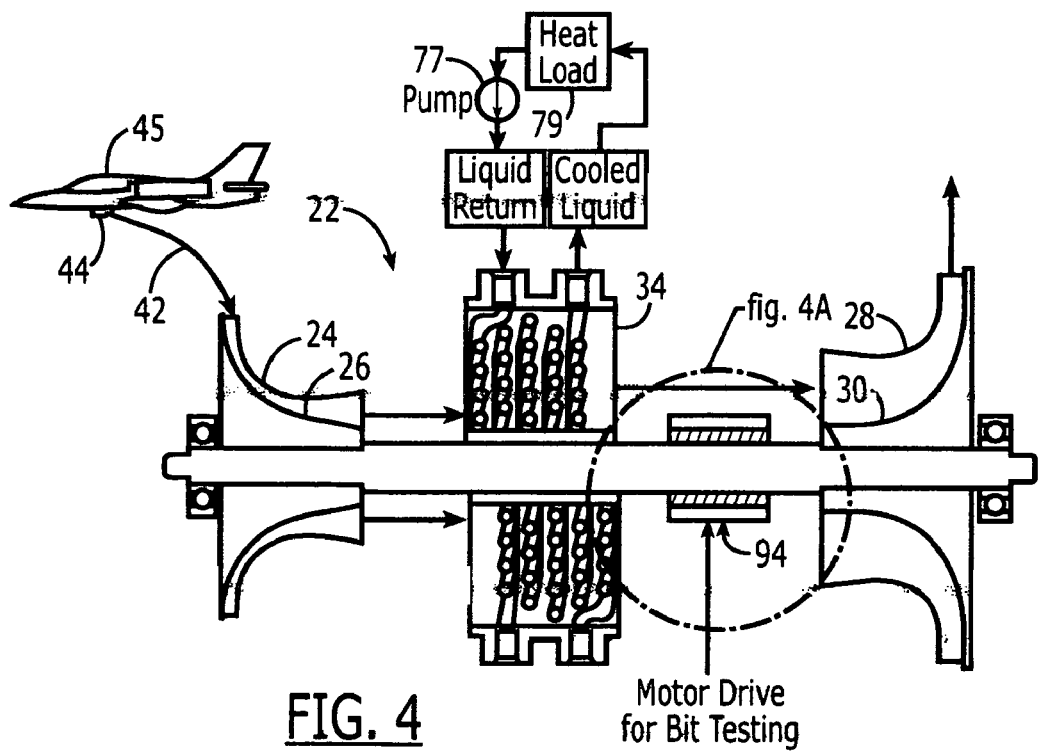
FIG. 4 is a schematic view of a second embodiment of the air conditioning apparatus invention.
Figure 4A:
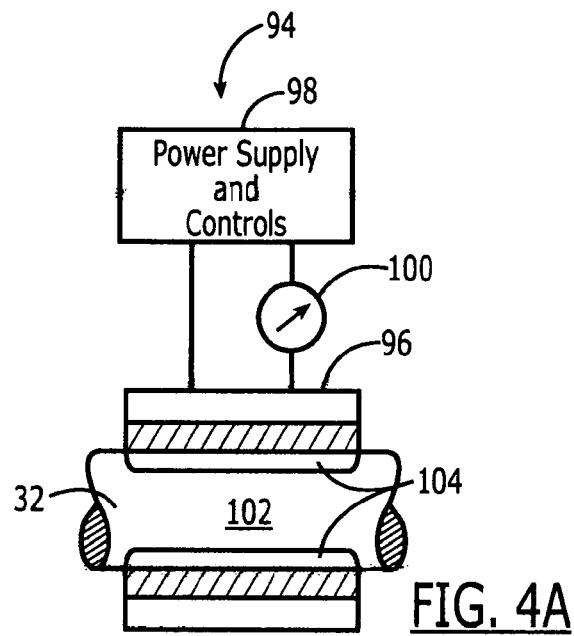
FIG. 4A is an enlarged view of a portion of the air conditioning apparatus invention illustrated in FIG. 4 taken within the circle 4A thereof.

It is often desirable to check components on an aircraft prior to flight. Since the air conditioning apparatus 22 functions only when provided with ram air from a moving aircraft, FIGS. 4 and 4A illustrate a modification of the air conditioning apparatus 22 illustrated in FIGS. 2 and 3. This modification of the air conditioning apparatus 22 adds built in test equipment 94 that allows the air conditioning apparatus 22 to be tested prior to flight. The built in test equipment 94 comprises an electric motor 96, an electrically connected combined power supply and control section 98 and a current sensor comprising an ammeter 100. With this built in test equipment 94, a small amount of electrical power from the power supply and controls section 98 can cause the rotating assembly including the two rotors 26 and 30 to be rotated by the motor 96. In use, the current draw of the small motor 96 is monitored by the current sensor 100 and if the current draw does not exceed a specified limit, it is reasonable to assume that the bearings 38 and 40 are functioning normally. Conversely, If the shaft 32 does not rotate freely due to a bearing 38 or 40 problem or some other failure mechanism, the current draw indicated by the current sensor 100 will be high, indicating that a problem exists with the air conditioning apparatus 22, and maintenance action is required. It will be noted that the armature 102 of the motor 96 is actually part of the shaft 32. In this connection, as illustrated in FIG. 4A, magnetic inserts 104 are provided in the armature 102 to permit it to act and rotate as a motor armature 102.

Figure 5:
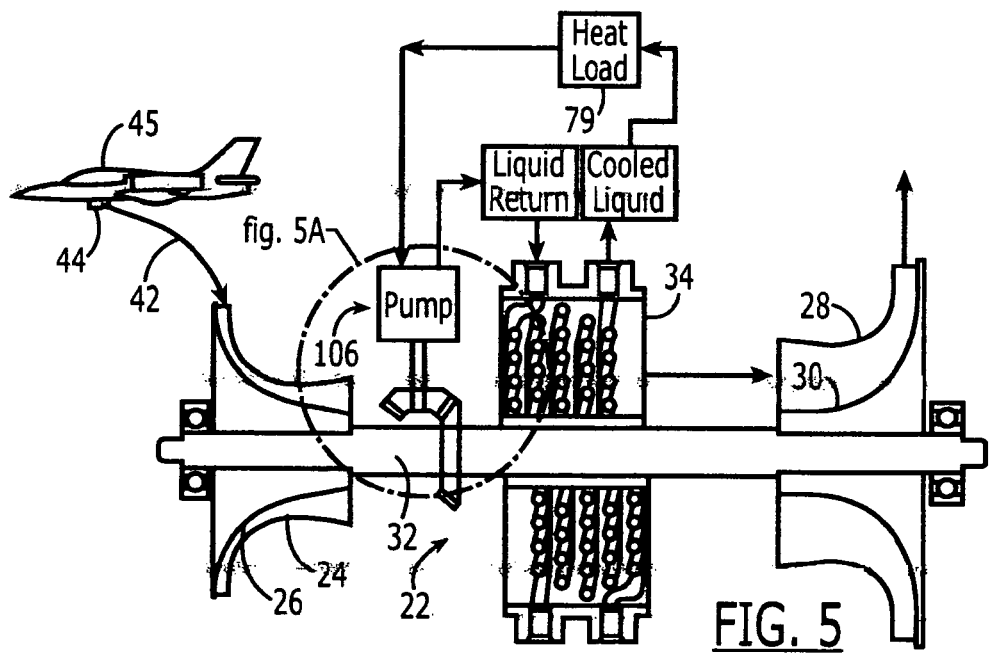
FIG. 5 is a schematic view of a third embodiment of the air conditioning apparatus invention.
Figure 5A:
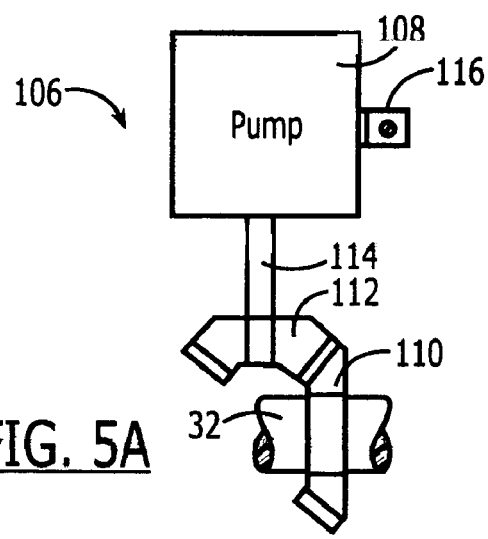
FIG. 5A is an enlarged view of a portion of the air conditioning apparatus invention illustrated in FIG. 5 taken within the circle 5A thereof.

FIGS. 5 and 5A illustrate a third embodiment of the air conditioning apparatus 22 that incorporates a pump system 106 including a pump 108 that is part of the air conditioning apparatus 22, that does not require any source of outside power since the pump 108 is powered by the air conditioning apparatus 22 itself. This alternate configuration, that may be desirable, incorporates a bevel gear 110 mounted on the shaft 32 that is fixed to and rotates with the shaft 32 This bevel gear 110 meshes with another bevel gear 112 that is fixed to the end of a rotatable shaft 114 that has its other end connected to the pump 108. In view of this arrangement, rotation of the shaft 32 causes rotation of the bevel gears 110 and 112 and rotation of the shaft 114 to cause the pump 108 to operate. This configuration would be advantageous for applications which cannot incorporate an electrically driven pump external to the air conditioning apparatus 22. As previously indicated, the pump 108 is used to circulate the liquid coolant, delivering it to the heat load 79 and to the heat exchanger 34. As illustrated in FIG. 5A, the pumping elements would be affixed to the static structure of the air conditioning apparatus 22 by a bracket 116 or the like. In this manner turbine power is used to drive the pump 108 and no external power is required to circulate the liquid coolant.

Figure 6:
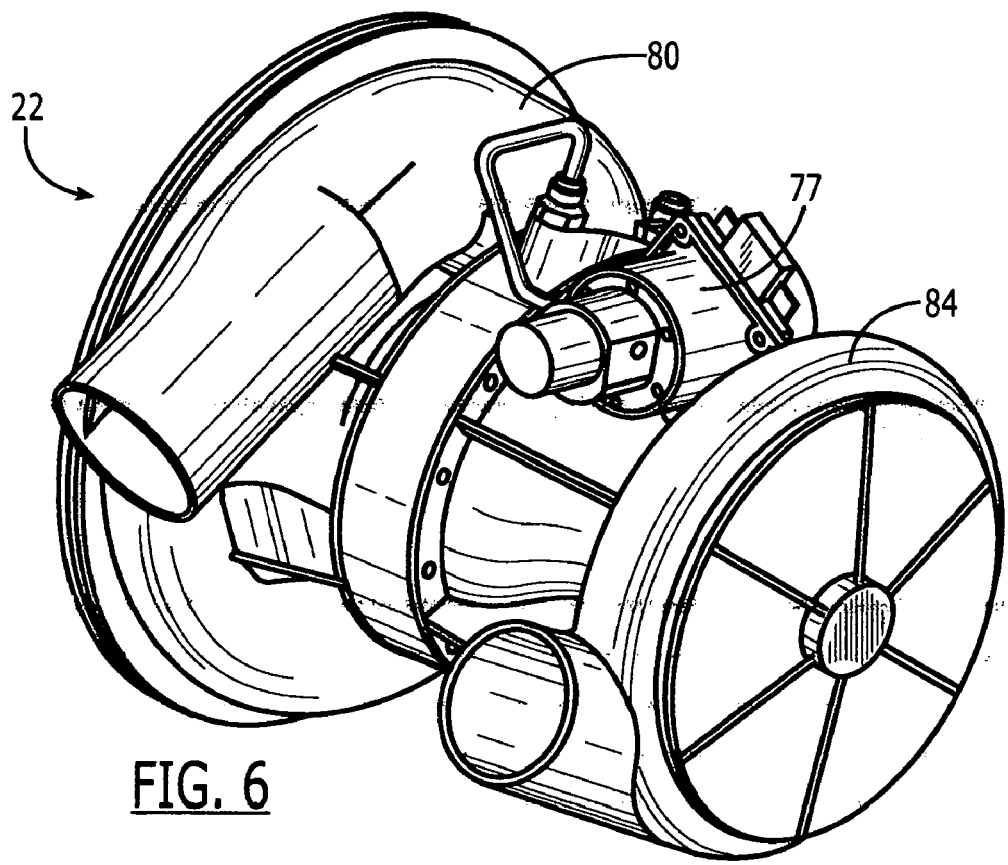
FIG. 6 is a perspective view of the air conditioning apparatus invention with the addition of an external coolant pump.

In FIG. 6 a perspective view of the exterior of the air conditioning apparatus 22 is illustrated. In this FIG. 6, an exterior pump 77 is illustrated and hence this exterior perspective view is consistent with the embodiments set forth in FIGS. 2, 3 and 4. A perspective view for the embodiment set forth in FIG. 5 would appear to be similar, but the exterior pump 77 would not be visible. As illustrated in FIG. 6 the air conditioning apparatus 22 has three basic housings that are connected together by bolts or the like known in the art. These housings are the turbine housing 80 that is connected to the heat exchanger housing 58 which in turn is connected to the compressor housing 84.

Figure 7:
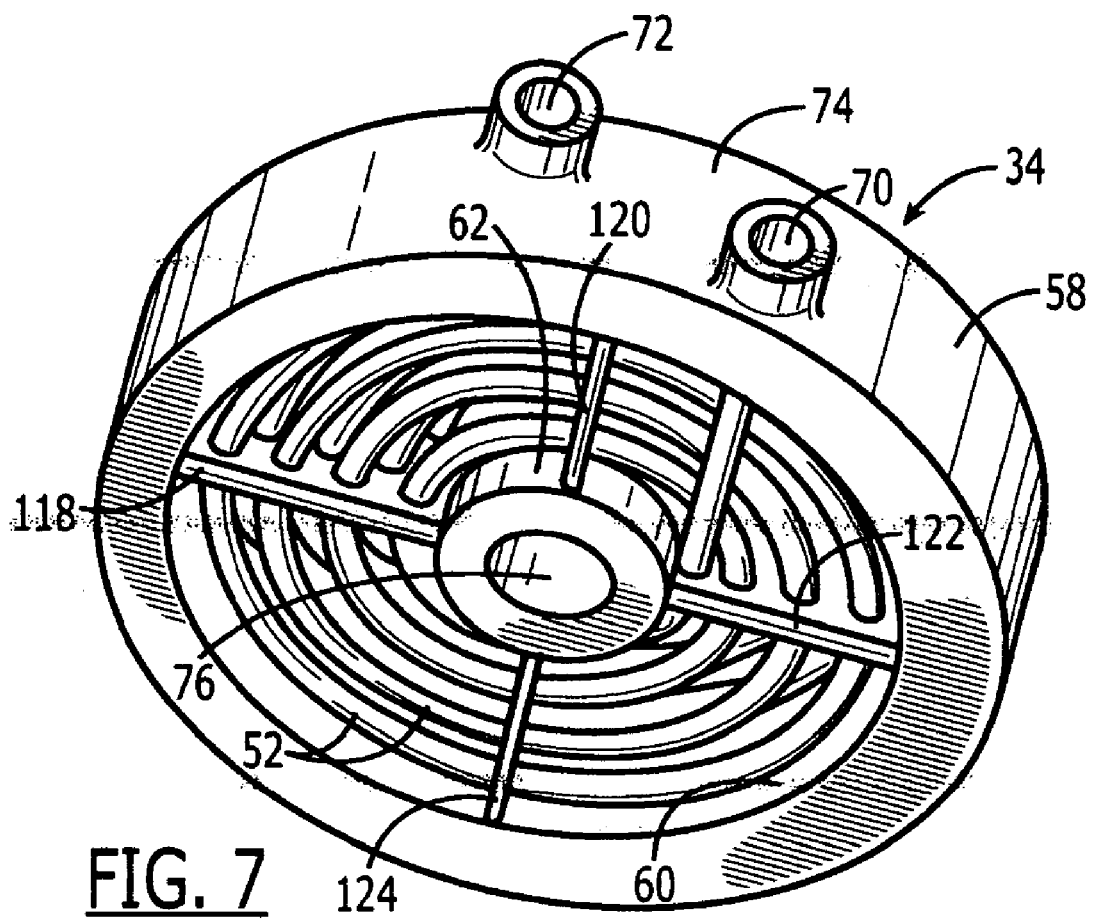
FIG. 7 is an enlarged perspective view of a heat exchanger that forms a portion of the air conditioning apparatus invention illustrated in FIGS. 2, 3, 4, 5 and 6.

FIG. 7 is a perspective view of the exterior of the heat exchanger 34 of the air conditioning apparatus 22. FIG. 7 shows the heat exchanger 34 with the outer ring shaped heat exchanger housing 58, the circular spiral shaped hollow cooling coils 52 located within the aperture 60 in the heat exchanger housing 58. It also illustrates that the cooling coils 52 secured inside the aperture 60 by being connected to the outside of a ring-shaped mounting hub 62 that is centrally located and secured inside the aperture 60 in the heat exchanger housing 58 by radiating positioning members 118, 120, 122 and 124 that radiate outward from the hub 62. As illustrated and as indicated previously, apertures 70 and 72 are located in he outer surface 74 of the heat exchanger housing 58 for receiving coolant from the outer ends of the hollow cooling coils 52. Also, as illustrated and as indicated previously, the hub 62 has a centrally located hole 76 that is sized and shaped to accept the rotating shaft 32 of the air conditioning apparatus 22.

The air conditioning apparatus 22 invention is used in the following manner. Assuming that it is desired to check out the condition of the air conditioning apparatus 22 prior to flight, which as previously indicated, is possible using the built in test equipment 94 set forth in FIGS. 4 and 4A, power is supplied to the motor 96 using the appropriate controls on the power supply and controls section 98 of the built in test equipment 94. This electric power will cause the motor 96 to operate which will cause its armature 102 to rotate. The current sensor which comprises the ammeter 100 is then monitored and if its reading is normal, this means that the bearings 38 and 40 of the air conditioning apparatus 22 are satisfactory and the air conditioning apparatus 22 is ready for flight. Conversely, if the reading on the current sensor 100 is high, this means that at least one of the bearings 38 and 40 of the air conditioning apparatus 22 is bad and the air conditioning apparatus 22 is not ready for flight. In this case appropriate action such as replacing one or more of the bearings 38 or 40 would be taken and the built in test equipment 94 would again be used to retest the bearings 38 and 40.

When the air conditioning apparatus 22 is in flight, as indicated in FIGS. 2, 4 and 5, ram air flow, indicted by the arrow 42, from an aircraft air scoop 44 of an aircraft 45 is ducted through the conduit 43 to the turbine inlet 46 of the turbine 24. The ram air 42 enters the turbine 24 and expands as it passes through the turbine 24, performing work and hence giving up heat and consequently the air leaves the turbine 24 at a lower temperature than it entered the turbine 24. This lower temperature air enters the heat exchanger 34 that is mounted within the air conditioning apparatus 22 directly downstream of the turbine exhaust outlet 50. The cooler turbine exhaust air passes through this heat exchanger 34 and cools the liquid coolant flowing within the coils 52 of the heat exchanger 34. It will be noted that an external pump 77 is used to circulate coolant in the air conditioning apparatus 22 embodiments set forth in FIGS. 2, 3, 4, and 6 and that the internal pump system 106 is used to circulate coolant in the embodiment of the air conditioning apparatus 22 set forth in FIGS. 5 and 5A. After passing through the heat exchanger 34, the air enters the compressor inlet 54 and is compressed in the compressor 28, which is directly driven by the turbine rotor 26 through the common shaft 32. The air leaves the compressor 28 after passing through the diffuser 55 and enters its outlet 56 and is ducted out of the air conditioning apparatus 22 and overboard from the aircraft 45. As a result of this action, cooling takes place within the aircraft 45 where the heat load 79 is located.

Although the invention has been described in considerable detail with reference to certain preferred embodiments, it will be understood that variations or modifications may be made within the spirit and scope of the invention as defined in the appended claims.

What is claimed is:

1. An air conditioning apparatus configured to handle air from an aircraft comprising a turbine with an inlet and an outlet and having a rotor, a compressor with an inlet and an outlet and having a rotor, a heat exchanger, and a common rotatable shaft with the turbine rotor and the compressor rotor being mounted on and fixed to the common rotatable shaft and wherein the air conditioning apparatus has an upstream end portion and a downstream end portion and wherein the turbine is located upstream of the compressor with the heat exchanger being located around the common rotatable shaft between the turbine and the compressor with the heat exchanger having an opening sized and shaped to accept the common rotatable shaft and allow the shaft to freely rotate inside the opening with the heat exchanger being located downstream of the turbine outlet in position to receive air from the turbine outlet and the compressor being located adjacent to and downstream from the heat exchanger with the compressor inlet positioned to receive air exiting from the heat exchanger and means for connecting the turbine of the air conditioning apparatus to a source of ram air.

2. The air conditioning apparatus of claim 1 wherein the heat exchanger has cooling coils configured to allow the air from the turbine to pass over the cooling coils.

3. The air conditioning apparatus of claim 1 wherein the common rotatable shaft is supported by bearings and the bearings are located exterior of the turbine and the compressor.

4. The air conditioning apparatus of claim 1 further comprising a housing for the turbine, heat exchanger and the compressor.

5. The air conditioning apparatus of claim 4 wherein the housing for the compressor has a diffuser section.

6. The air conditioning apparatus of claim 1 wherein the means for connecting the turbine of the air conditioning apparatus to the source of ram air comprises a conduit for ram air.

7. An air conditioning apparatus configured to handle air from an aircraft comprising a turbine with an inlet and an outlet and having a rotor and a compressor with an inlet and an outlet and having a rotor, a heat exchanger, and a common rotatable shaft with turbine rotor and the compressor rotor mounted on and fixed to the common rotatable shaft wherein the air conditioning apparatus has an upstream end portion and a down stream end portion and wherein the turbine is located upstream of the compressor with the heat exchanger located around the common rotatable shaft between the turbine and the compressor with the heat exchanger having an opening sized and shaped to accept the common rotatable shaft and allow the shaft to freely rotate inside the opening with the heat exchanger being located downstream of the turbine outlet in position to receive air from the turbine outlet and the compressor being located adjacent to and downstream from the heat exchanger with the compressor inlet positioned to receive air exiting from the heat exchanger and means for connecting the turbine of the air conditioning apparatus to a source of ram air and wherein the compressor is located and configured so that $Pamb > Pci$ where: $Pci$=Air pressure at the compressor inlet $Pamb$=Ambient air pressure outside the aircraft when the air conditioning apparatus is in normal use in the aircraft.

8. The air conditioning apparatus of claim 7 wherein the heat exchanger has cooling coils configured to allow the air from the turbine to pass over the cooling coils.

9. The air conditioning apparatus of claim 7 wherein the turbine is located and configured so that:

$Pti \gg Pto$ where:

$Pti$=Air pressure at the turbine inlet $Pto$=Air pressure at the turbine outlet when the air conditioning apparatus is in normal use in the aircraft.

10. The air conditioning apparatus of claim 9 wherein:

$Pto$ essentially=$Pci$ when the air conditioning apparatus is in use in the aircraft, whereby the use of sealing means associated with the rotors of the turbine and the compressor is obviated.

* * * * *